United States Patent [19]
Haffner

[11] Patent Number: 5,339,770
[45] Date of Patent: Aug. 23, 1994

[54] EXERCISE AND AMUSEMENT TOY FOR PETS

[76] Inventor: Roberta L. Haffner, 9225 Longrun Dr., Juneau, Ak. 99801

[21] Appl. No.: 124,595

[22] Filed: Sep. 22, 1993

[51] Int. Cl.$^5$ ............................................. A01K 15/02
[52] U.S. Cl. .................................................. 119/708
[58] Field of Search ............... 119/702, 707, 708, 709; 446/236, 241

[56] References Cited

U.S. PATENT DOCUMENTS

| | | | |
|---|---|---|---|
| 1,100,624 | 6/1914 | Shideler | 446/241 |
| 2,628,094 | 2/1953 | Matrejek | 446/241 |
| 2,808,807 | 10/1957 | Winton et al. | 119/702 |
| 5,148,769 | 9/1992 | Zelinger | 119/708 |

*Primary Examiner*—Thomas Price
*Attorney, Agent, or Firm*—Hugh E. Smith

[57] ABSTRACT

An exercise and amusement toy for a dog or other pet including a supported umbrella-shaped top or dome with toys suspended by resilient lines, such as ropes or cables from the rim of the dome. The dome is supported and held upright by an intermediate elongated standard member, which in turn is supported by a portable base plate. The intermediate member is formed of an upper spring member that is coupled to a lower stationary tubular member. The spring member allows for rotation and slight bending motion of the dome, when the pet plays with the suspended toys. The preferred embodiment is suitable for indoor and outdoor use. In another embodiment, the lower stationary tubular member tapers to a point resembling a typical stake. A pet owner can then drive the tubular member into the ground, preferably outdoors, thus securing the pet toy in an upright position without use of the base plate.

11 Claims, 3 Drawing Sheets

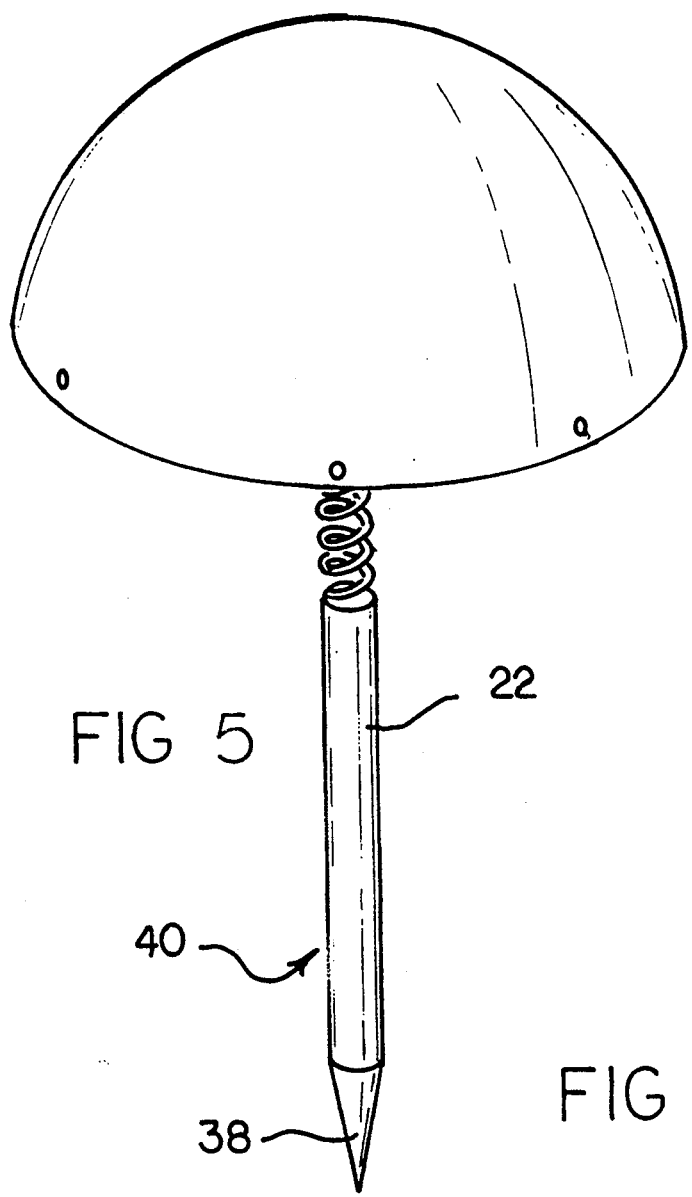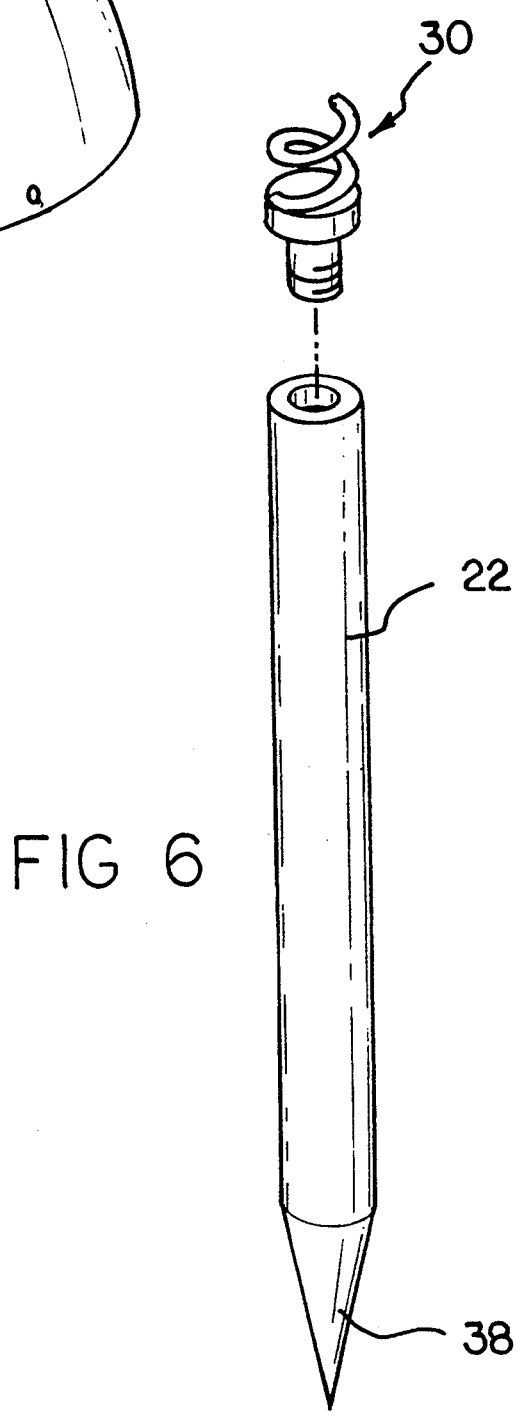

EXERCISE AND AMUSEMENT TOY FOR PETS

BACKGROUND OF THE INVENTION

1. Field of the Invention

The present invention relates to pet toys and more specifically pertains to pet toys that provide exercise and entertainment for pets, particularly when they have to stay outside or are left alone for any length of time.

2. Description of the Prior Art

The use of pet toys is known in the prior art. More specifically, pet toys heretofore devised and utilized for the purpose of providing exercise and amusement for pets are known to consist basically of familiar, expected and obvious structural configurations, notwithstanding the myriad of designs encompassed by the crowded prior art which have been developed for the fulfillment of countless objectives and requirements.

The present invention is directed to improving toys that provide exercise and amusement for pets in a manner which is safe, secure, economical and aesthetically pleasing.

Pet owners are concerned with their pets well-being and it is a common desire to provide them with playful exercise to keep them in good health. Numerous toys have been devised to entertain and provide exercise for pets, such as dogs and cats. These toys are especially valuable when the pets are left alone, confined to small areas, or are outside away from their owners.

The use of pet toys is known in the prior art. More specifically, exercise and amusement toys for dogs or other pets. For example, an exercise and amusement device for pets is shown and described in U.S. Pat. No. 5,111,771 to Mathews, which has a reinforced rubber tube stuffed with a sponge rubber stuffing and is suspended from a mounting bracket, ceiling, tree limb, etc.

Another example of a pet toy is described in U.S. Pat. No. 5,092,272 that comprises a length of cotton rope which is woven so as to define a closed loop handle, a shaft portion extending from the loop handle and a pair of tail portions extending from the shaft portion.

A further patent of interest is U.S. Pat. No. 322,147 which shows an ornamental design of a toy for a dog or other pet. Additionally, U.S. Pat. No. 323,005 shows an ornamental design of a toy dog.

A therapeutic dental hygienic pet toy is shown and described in U.S. Pat. No. 4,802,444 that includes an elastomeric body with at least one groove open on the outer surface. As the toy is chewed by the pet it facilitates scraping plaque and other debris from the teeth.

Another relevant patent of interest includes U.S. Pat. No. 3,476,086.

Drawbacks of the prior art pet toys are lack of a variety of toys and aids present within the overall device. The present invention provides the pet with a variety of toys, such as imitation birds or cats, a hollow ball with a bell contained inside, and rawhide bones. Some of the toys may emit sounds when squeezed by the pet, such as a squeaking noise. This helps to provoke interest from the pet. The toys provide playful exercise and the rawhide bones, in particular, aid in cleaning the pet's teeth and massaging the pet's gums.

Further, unlike the invention described in U.S. Pat. No. 5,111,771, the present invention can provide the pet with some degree of weather protection if the toy and pet are outdoors and the pet lies underneath the dome. The height of the dome member is made to allow space for the pet to remain underneath it, if the pet desires to do so. Also, the pet toy is versatile in that besides having a variety of toys available, the pet can cause the dome with dangling toys to spin in circles creating an additional desired feature of running exercise for the pet.

Further, the pet toy has two designs allowing flexibility in how the toy can be placed in different locations. One design has a base plate and is suitable for indoor or outdoor sites. The second design does not employ the base plate, but instead takes on a typical stake appearance and is more suitable for outdoor use. The prior art toys are shown as more suitable for outdoors and large size dogs, as in U.S. Pat. No. 5,111,771 or shown as hand-held toys, causing the pet owner to participate in the play event, as in U.S. Pat. No. 5,092,272. The present invention is a stand-alone toy, such that an owner does not have to be present for the play event. The other prior art toy shown in U.S. Pat. No. 4,802,444 is simply an individual chew bone. The present invention offers more variety to the pet.

In this respect, the pet toy according to the present invention substantially departs from the conventional concepts and designs of the prior art, and in so doing provides an apparatus primarily developed for the purpose of providing exercise and amusement for pets.

Therefore, it can be appreciated that there exists a continuing need for new and improved pet toy which can provide exercise and amusement for the pet. In this regard, the present invention substantially fulfills this need.

As illustrated by the background art, efforts are continuously being made in an attempt to create a variety of pet toys. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of pet toys now present in the prior art, the present invention provides an improved pet toy construction wherein the same can be utilized for providing exercise and amusement for pets. As such, the general purpose of the present invention, which will be described subsequently in greater detail, is to provide a new and improved pet toy apparatus and method which has all the advantages of the prior art pet toys and none of the disadvantages.

The invention is defined by the appended claims with the specific embodiment shown in the attached drawings. For the purpose of summarizing the invention, the invention may be incorporated into a new and improved pet toy for providing exercise and amusement for a dog or other pet. This pet toy comprises an umbrella-shaped top or dome with toys suspended by resilient lines, such as ropes or cables. The resilient lines are passed through and attached to apertures arranged along the periphery of the dome. The resilient lines suspend the toys at a predetermined height and provides elastic resistance to pulling of the toys by the pet. The dome is supported by an elongated standard member supported by a portable base. The elongated standard member is formed of an upper spring member that is coupled to a lower stationary tubular member. The spring member allows for rotation and slight bending movement of the dome, when the toy is in use. The lower end of the tubular member is fixedly secured to the midpoint of the base plate by a bolt.

An alternate embodiment of the invention comprises the lower tubular member tapering to a point, thus resembling a typical stake. This allows the pet owner to drive the stake into the ground, therefore securing the pet toy in an upright position when assembled, without use of the base plate. This stake design is preferably for outdoor sites.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved pet toy for providing exercise and amusement for a dog or other pet comprising a semi-hemispherical dome, the dome having a plurality of apertures therethrough along the periphery thereof; a coupling means positioned on the underneath side of the dome at the midpoint thereof for receiving an elongated standard member therein, the elongated standard member formed of an upper helical spring member, providing rotative means, and a lower hollow stationary tubular member; a connecting means for securing the lower end of the spring member to the upper end of the tubular member in a rotative fashion; a portable base plate member for receiving the lower end of the elongated standard, thus securing the elongated standard in an upright position, the base plate member including attaching means at the midpoint thereof; a plurality of toys suspended from the dome thereof; a plurality of resilient lines, the upper portion of the lines passing through and being attached thereto said apertures; and an alternate embodiment of the present invention, wherein the lower end of the tubular member tapers to a point, resembling a stake structure.

A further object of the present invention is to provide a pet toy that incorporates a variety of toys and aids within the overall model, such as imitation birds or cats, a hollow ball with a bell contained inside, and rawhide bones.

A still further object of the present invention is to provide a pet toy that can emit sounds, such as a squeaking noise when played with by the pet to provoke interest from the pet.

Another object of the present invention is to provide the pet with protection from the elements if the toy and pet are outdoors and the pet lies underneath the dome, whereby the height of the dome member is such that it allows space for the pet to remain underneath, if the pet desires.

A further object is to provide further enhancements in that besides having a variety of toys available, the pet can cause the dome with dangling toys to spin in a circular motion creating an additional desired feature of promoting running exercise for the pet.

An even further object is to have two designs allowing flexibility in how the toy can be placed in different locations, wherein one design has a base plate and is suitable for indoor or outdoor sites and the second design does not employ the base plate, but instead takes on a typical stake appearance and is more suitable for outdoor use.

Still yet another object of the present invention is to provide a pet toy for small or large pets and to offer a pet entertainment when the pet owner is away, whereby the pet owner does not have to participate in the play activity.

It is another object of the present invention to provide a pet owner the option to replace any of the suspended toys or aids that may be damaged by the pet.

It is therefore an additional object of the present invention to provide a new and improved pet toy which has all the advantages of the prior art pet toys and none of the disadvantages.

It is another object of the present invention to provide a new and improved pet toy which may be easily and efficiently manufactured and marketed.

It is a further object of the present invention to provide a new and improved pet toy which is of a durable and reliable construction.

An even further object of the present invention is to provide a new and improved pet toy which is susceptible of a low cost of manufacture with regard to both materials and labor, and which accordingly is then susceptible of low prices of sale to the consuming public, thereby making such pet toys economically available to the buying public.

Still yet another object of the present invention is to provide a new and improved pet toy which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a perspective view of an alternate embodiment of the present invention comprising a lower portion of the tubular member having tapering to a point.

FIG. 6 is an enlarged partial perspective view of the pet toy is shown FIG. 5 showing the spring member is coupled to the tubular member.

DESCRIPTION OF THE PREFERRED EMBODIMENT

Figure 1:
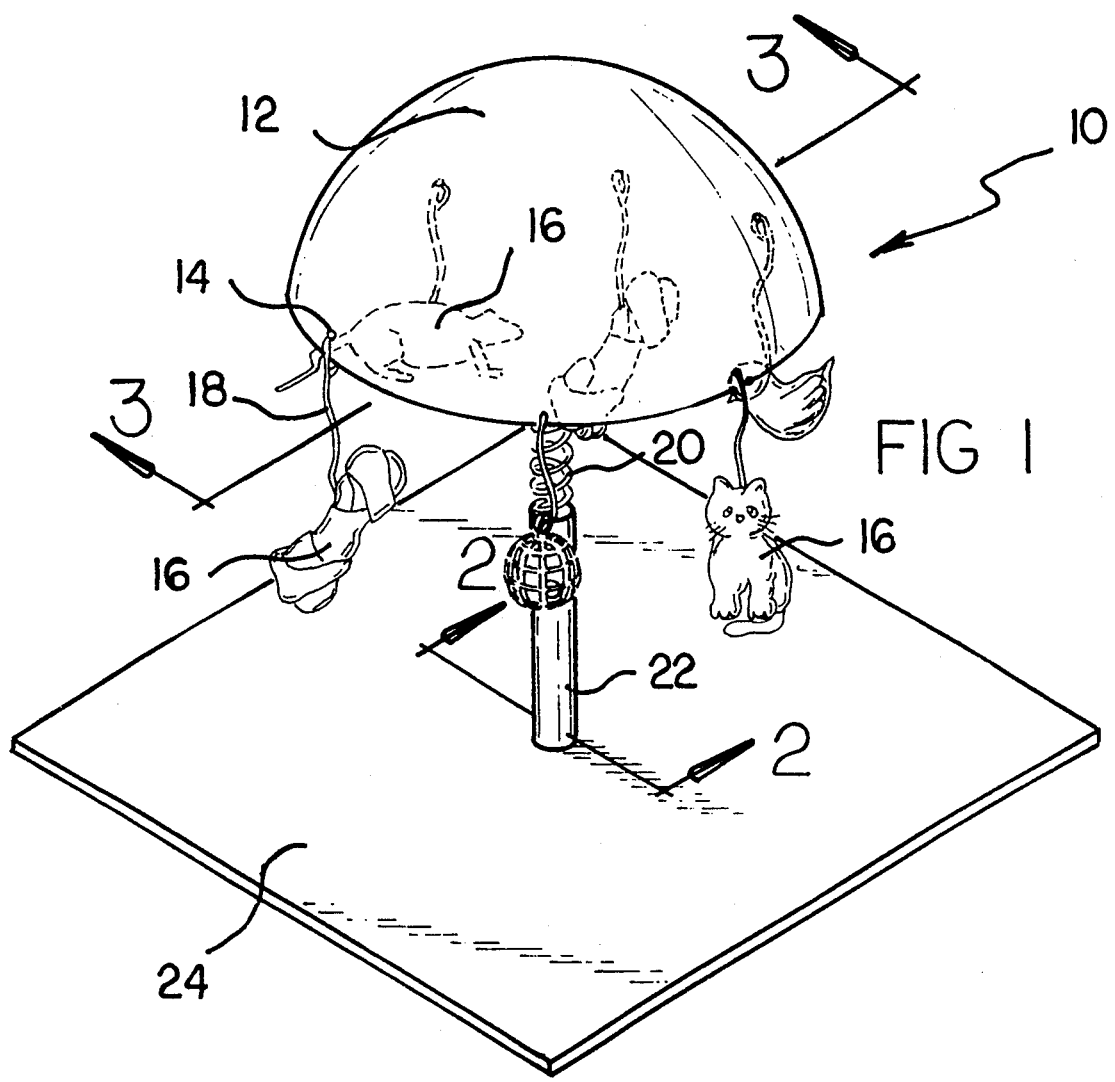
FIG. 1 is perspective view showing the preferred embodiment of the exercise and amusement toy for pets comprising the present invention.

With reference now to the drawings, and in particular to FIG. 1 thereof, a new and improved pet toy embodying the principles and concepts of the present invention and generally designated by the reference numeral 10 will be described.

From an overview standpoint, FIG. 1 shows a view of the present pet toy 10, which is employed to promote exercise and amusement for a dog or other pet. The pet toy 10 is of knockdown construction, thus it can be assembled or disassembled quickly and moved to different locations easily. The present invention is suitable for indoor and outdoor sites.

The exercise and amusement toy for pets comprises an umbrella-shaped top or dome 12. The dome 12 is semi-hemispherical and preferably formed of a hard, translucent plastic material. The pet toy 10 allows the pet to gain protection from the elements when the pet lays underneath the dome 12. The dome 12 has a plurality of apertures 14 therethrough along the periphery thereof. Preferably, the apertures 14 number six and are spaced equally along the dome's 12 periphery. The dome member 12 supports a plurality of toys 16 therefrom, the toys 16 being suspended by resilient lines 18, such as ropes or cables. The lines 18 pass through the apertures 14 and are fixed in relationship thereto. The toys 16 and lines 18 are removably secured for easy replacement by a pet owner.

The dome 12 is supported by an elongated standard member formed of an upper helical spring member 20 and a lower tubular member 22. The spring member 20 supports the dome 12 and allows for rotation and slight bending motion of the dome 12, during such times as when the suspended toys 16 are being played with by the pet. This creates an additional feature of providing running exercise for the pet as the dome spins in response to movement of the toys 16.

Figure 2:
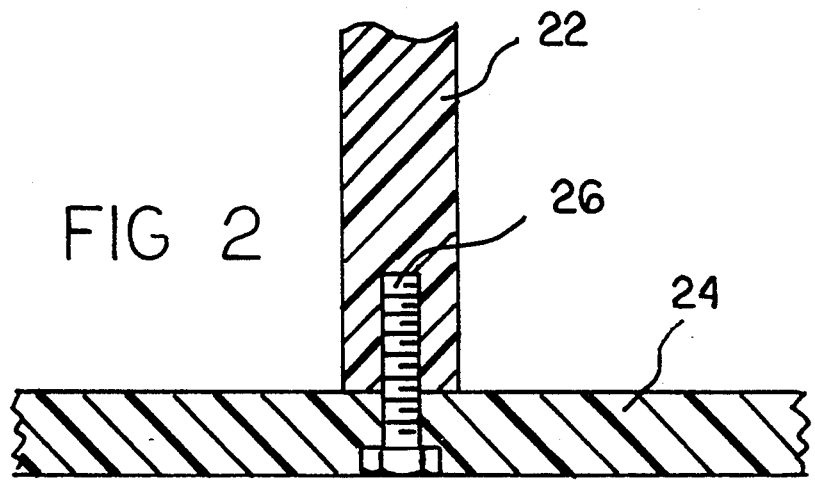
FIG. 2 is a cross-sectional view of a lower tubular member coupled by a bolt to the base plate of the present invention along line 2—2.

Further, the lower end of the lower tubular member 22 is removably secured to a base plate member 24 at the midpoint thereof. The base plate member 24 is secured by a bolt 26, as shown in FIG. 2.

Figure 3:
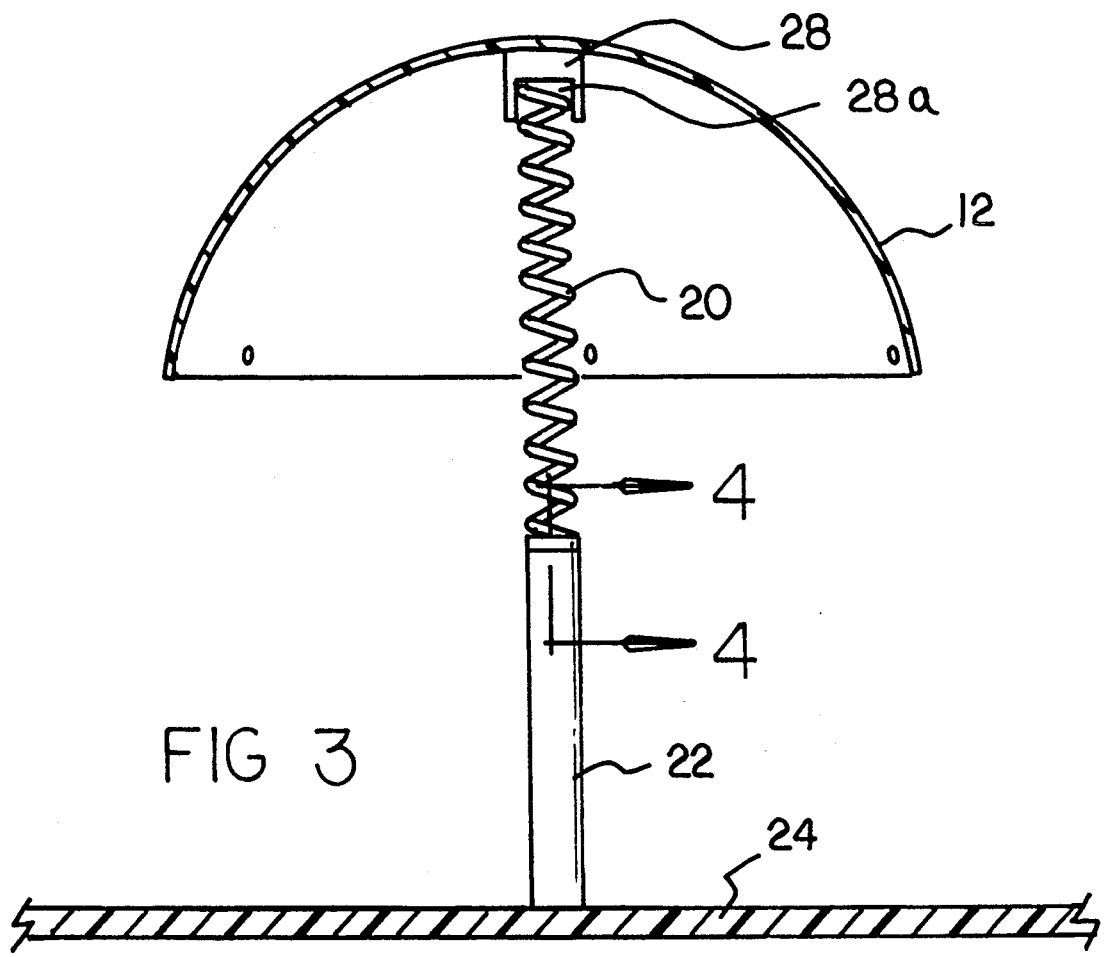
FIG. 3 is a cross-sectional view taken along line 3—3 of the present invention, particularly showing an elongated standard member for holding the toy in an upright position.

As illustrated in FIG. 3, a coupling assembly is positioned on the underneath side of the dome 12 at the midpoint thereof. The coupling assembly comprises a cylindrical housing 28 integral with the dome 12. The cylindrical housing 28 is formed of a lower facing recess portion 28a for receiving the upper end of the spring member 20, thus fixedly securing the spring member 20 to the dome 12.

Figure 4:
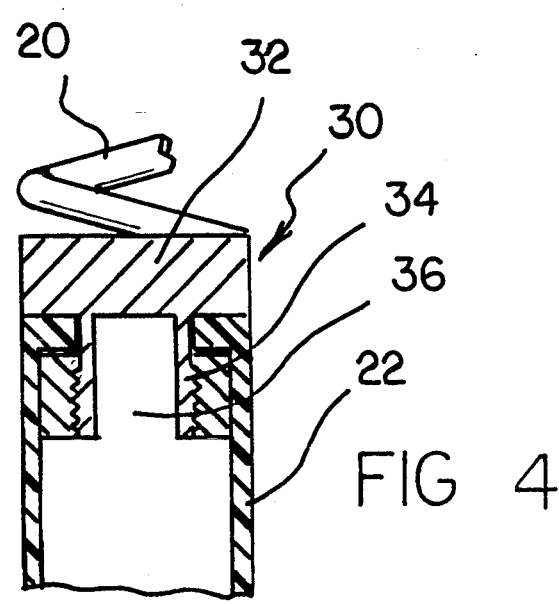
FIG. 4 is a partial cross-sectional view taken alone line 4—4 of coupling of a spring member to the tubular member.

The spring member 20 and the tubular member 22 are connectible end-to-end in an aligned rotative relationship. FIG. 4 shows a joint assembly 30 for securing the lower end of the spring member 20 to the upper end of the tubular member 22. The spring member 20 comprises a cap member 32 integral therewith, having a hollow threaded screw portion 34 extending down and engaging the upper end of the tubular member 22. The tubular member 22 is comprised of a hollow portion 36 and is of decreased diameter for snugly and threadedly receiving the spring member 20. The cap member 32 is welded to the lower end of the spring member 20 and serves to seal the joint assembly 30.

Once the dome 12, the spring member 20, and the tubular member 22 are connected properly, the pet toy 10 is then maintained in an upright position by securing the lower end of the stationary tubular member 22 to the midpoint of the base plate member 24 with the bolt 26. The bolt 26 serves to deter rotation of the tubular member 22 relative to the base plate member 24.

An alternate embodiment of the present invention is shown in FIG. 5. As illustrated, the lower portion of the tubular member 22 tapers to a point 38, thus resembling a typical stake 40. This provides a piercing function, which allows the pet owner to employ a tool, such as a hammer, to strike the top portion of the stake member thus driving the stake member 40 into the ground. The properly assembled pet toy 10 is then maintained in an upright position without using the portable base plate member 24. This alternate embodiment of the present invention is preferably for outdoor usage. The base plate member 24 is suitable for outdoor sites, as well as indoor sites.

In FIG. 6, the method of coupling the spring member 20 to the tubular member 22 is shown. It is another view of the connection shown in FIG. 4, for the first embodiment of the present invention. FIG. 4 shows a cross-sectional view of the hollow threaded screw member 34 already coupled to the tubular member 22. FIG. 6 shows a perspective view of the alternate embodiment of the hollow screw member 24 being lowered to be threadedly received by the upper end of the stake member 40.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by Letters Patent of the United States is as follows:

1. A new and improved pet toy for providing exercise and amusement for a dog or other pet comprising:
   a semi-hemispherical dome having a plurality of apertures therethrough along periphery thereof, the apertures preferably six in number and spaced equally along said periphery;
   a helical spring member adjacent an underneath side of the dome, the spring member allowing rotation of the dome and allowing slight bending motion of said spring member;
   a coupling assembly positioned on the underneath side of the dome at a midpoint thereof comprising a cylindrical housing integral with the dome, the cylindrical housing having a downwardly facing recess pocket means for receiving an upper end of the helical spring member therein;
   an elongated standard member comprising the upper helical spring member and a lower hollow stationary tubular member;
   a joint assembly for securing the lower end of the spring member to the upper end of the tubular member in a rotative relationship, wherein the spring member comprises a cap member integral therewith and a hollow threaded portion extending downward to engage the upper end of the tubular member, wherein the upper end of the tubular member comprises a decreased diameter for receiving said threaded portion therein;
   a portable base plate member having connective means at the midpoint thereof for receiving and securing a lower end of the elongated standard member;
   a bolt extending through the base plate member and engaging the lower end of the tubular member to deter rotation of the tubular member relative to the base plate member;
   a plurality of removably secured resilient lines, the resilient lines passing through and being attached to said dome through said apertures arranged along the periphery of the dome;
   a plurality of removably secured toys suspended from said resilient lines.

2. A new and improved pet toy for providing exercise and amusement for a dog or other pet comprising:
   a semi-hemispherical dome, the dome having a plurality of apertures therethrough along the periphery thereof;
   an elongated standard member formed of an upper helical spring member for providing rotation and a lower hollow stationary tubular member;
   a coupling means positioned on an underneath side of the dome at a midpoint thereof for receiving the elongated standard member therein;
   a connecting means for securing the lower end of the spring member to the upper end of the tubular member in a rotative fashion;
   a portable base plate member for receiving the lower end of an elongated standard member for securing the elongated standard in an upright position, the base plate member including attaching means for securing at the midpoint thereof;
   a plurality of resilient lines an upper portion of the lines passing through and being attached thereto said apertures in said dome;
   a plurality of toys suspended from the plurality of resilient lines.

3. The pet toy according to claim 2, wherein the lower end of the tubular member tapers to a point, resembling a stake structure.

4. The pet toy according to claim 2, wherein the apertures are preferably six in number and spaced equally along a periphery of the dome.

5. The pet toy according to claim 4, wherein the coupling means between the dome and spring member comprises a cylindrical housing integral with the dome, the cylindrical housing having a downwardly facing recess pocket means for receiving the upper end of the spring member therein.

6. The pet toy according to claim 5, wherein the rotation is provided by the spring member for allowing the dome member to rotate in response to movement of the suspended toys.

7. The pet toy according to claim 6, wherein the spring member is flexible allowing for slight bending movement.

8. The pet toy according to claim 7, wherein the connecting means between the spring member and the tubular member comprises a cap member integral to the lower end of the spring member having a hollow threaded portion extending down and engaging the upper end of the tubular member, the upper end of the tubular member having a decreased diameter for receiving a threaded portion therein.

9. The pet toy according to claim 8, wherein the lower end of the tubular member is secured to a midpoint base plate member thereof by a bolt to deter rotation of the tubular member relative to the base plate member.

10. The pet toy according to claim 9, wherein the plurality of toys are removably secured and are suspended from a plurality of removably secured resilient lines, the upper end of the resilient lines being attached to said apertures in said dome.

11. The pet toy according to claim 10, wherein the lower end of the tubular member tapers to a point, resembling a stake structure used for driving into the ground in order to secure the pet toy in an upright position without employing the base plate member.

* * * * *